June 28, 1966   R. E. FONTAINE   3,258,123
CENTRIPETAL SCALE PIT
Filed Aug. 22, 1963   3 Sheets-Sheet 1

INVENTOR.
Richard E. Fontaine
BY
Russell, Chittick & Pfund
Attorneys

June 28, 1966 R. E. FONTAINE 3,258,123
CENTRIPETAL SCALE PIT
Filed Aug. 22, 1963 3 Sheets-Sheet 3

INVENTOR.
Richard E. Fontaine
BY
Russell, Chittick & Pfund
Attorneys

United States Patent Office 3,258,123
Patented June 28, 1966

3,258,123
CENTRIPETAL SCALE PIT
Richard E. Fontaine, Auburn, Mass., assignor to Morgan Construction Company, Worcester, Mass., a corporation of Massachusetts
Filed Aug. 22, 1963, Ser. No. 303,904
3 Claims. (Cl. 210—259)

This invention relates to apparatus for separating solids from liquids and more particularly to a centripetal scale pit for use in a rolling mill in removing scale from cooling water.

Cooling water is applied to the rolls in a rolling mill in order to prevent overheating of the roll surfaces as stock is being passed therebetween. The water is usually taken from a readily available source such as a near-by river or lake and redeposited therein after having been applied to the roll surfaces during the rolling operation. It should be noted however, that as cooling water is passed over the rolls, it is unavoidably contaminated by lubricating oil, pieces of mill scale and other foreign matter. Consequently, in order to avoid pollution of the water source, these contaminative materials must be removed following the application of the cooling water to the rolls.

It is well known that if given sufficient time, mill scale will eventually settle to the bottom of any body of water due to its greater specific gravity. In accordance with this theory, the removal of mill scale from the returning flow of cooling water is at present accomplished through the use of elongated scale pits having enlarged cross-sectional areas designed to purposely retard the velocity of water flowing therethrough. Contaminated cooling water is introduced through an inlet at one end of the pit and allowed to flow its entire length before passing through an outlet at the opposite end. During the time that it takes for water to flow from the pit inlet to the pit outlet, scale is constantly settling through the water to the pit bottom. In addition, a series of weirs are often placed within the pit transverse to the direction of fluid flow in order to trap the finer scale particles which do not readily settle to the pit bottom. This settling process does not remove oil deposits which float on the water in the form of a surface layer or film. At present, this oil film is subsequently removed from the surface of the water by being manually skimmed by operating personnel using small buckets or hand shovels.

Experience has shown, however, that use of longitudinal scale pits of the aforementioned type has only been moderately successful in satisfactorily removing mill scale from the returning flow of cooling water. This is due in part to the fact that as scale settles to the pit bottom and begins accumulating, the effective cross-sectional area of the pit open to fluid flow is accordingly progressively decreased. Since the fluid velocity within the pit is inversely proportional to its cross-sectional area, this build-up of scale causes an increase in fluid velocity with the result that the scale remains suspended in the fluid passing through the outlet. In addition, because the particles of scale are of greatly varying mass, they will settle along the pit bottom along its entire length, making cleaning of the pit by a clam shovel or other conventional means during operation of the mill exceedingly difficult. Moreover, the deposits of scale will be disturbed and agitated during the cleaning operation with the result that a great deal of scale is often lost over the weirs.

Another significant disadvantage of conventional longitudinal scale pits is to be found in their overall size. It is of course apparent that the longer the pit is made, the longer the water will remain within its confines and the greater the chances are of having scale settle to the pit bottom. However, as modern mills are designed to run at ever increasing speeds, greater amounts of cooling water are required to cool the roll surfaces with a corresponding increase in conventional scale pit space requirements. In addition to the creation of mill design problems, the longer and larger scale pits will also result in substantial increases in construction expenditures.

A further disadvantage of conventional longitudinal scale pits is to be found in their relatively low percentage of efficiency in removing mill scale from the cooling water. At present, longitudinal scale pits are approximately 60% efficient when operating under ideal conditions (immediately after cleaning). However, with increased governmental attention being directed to the problem of water pollution, this percentage of efficiency is likely to be considered entirely inadequate for future mill installations.

A still further disadvantage of conventional apparatus now being utilized is to be found in the method of removing the oil film from the surface of the cooling water. Manual skimming is inefficient and expensive, requiring the frequent if not constant attention of operating personnel.

It has now been discovered that by utilizing a centripetal scale pit having a circular side wall, a sloping bottom and an annular weir rather than the conventional longitudinal design, the efficiency of the scale removal operation can be markedly improved while simultaneously reducing the overall pit size. In addition, the other aforementioned disadvantages resulting from scale build-up and random distribution according to particle size can be either completely avoided or substantially diminished through the use of this improved design.

In addition, the centripetal scale pit construction has been combined with an improved and fully automatic means of removing the surface oil film from the cooling water in order to provide a more efficient and less expensive means of removing contaminative material from cooling water.

Consequently, an object of the present invention is to provide a centripetal scale pit capable of improving the efficiency of the scale removal operation in a rolling mill.

Another object of the present invention is to provide a centripetal scale pit substantially smaller in size than the conventional longitudinal scale pits of equal capacity.

Another object of the present invention is to provide a centripetal scale pit in a rolling mill wherein the mill scale will settle at the center of the pit bottom in a concentrated pile, thereby facilitating subsequent pit cleaning operations.

A further object of the present invention is to provide a scale pit wherein the velocity of the cooling water flowing therethrough is not substantially increased by deposits of scale on the pit bottom.

Another object of the present invention is to provide a scale pit capable of being cleaned by conventional methods during operation of the mill without excessive loss of scale caused by agitation.

Another object of the present invention is to provide a means of efficiently and automatically removing oil from the cooling water.

These and other objects of the present invention will become more apparent as the description proceeds with the aid of the accompanying drawings in which.

Figure 1:
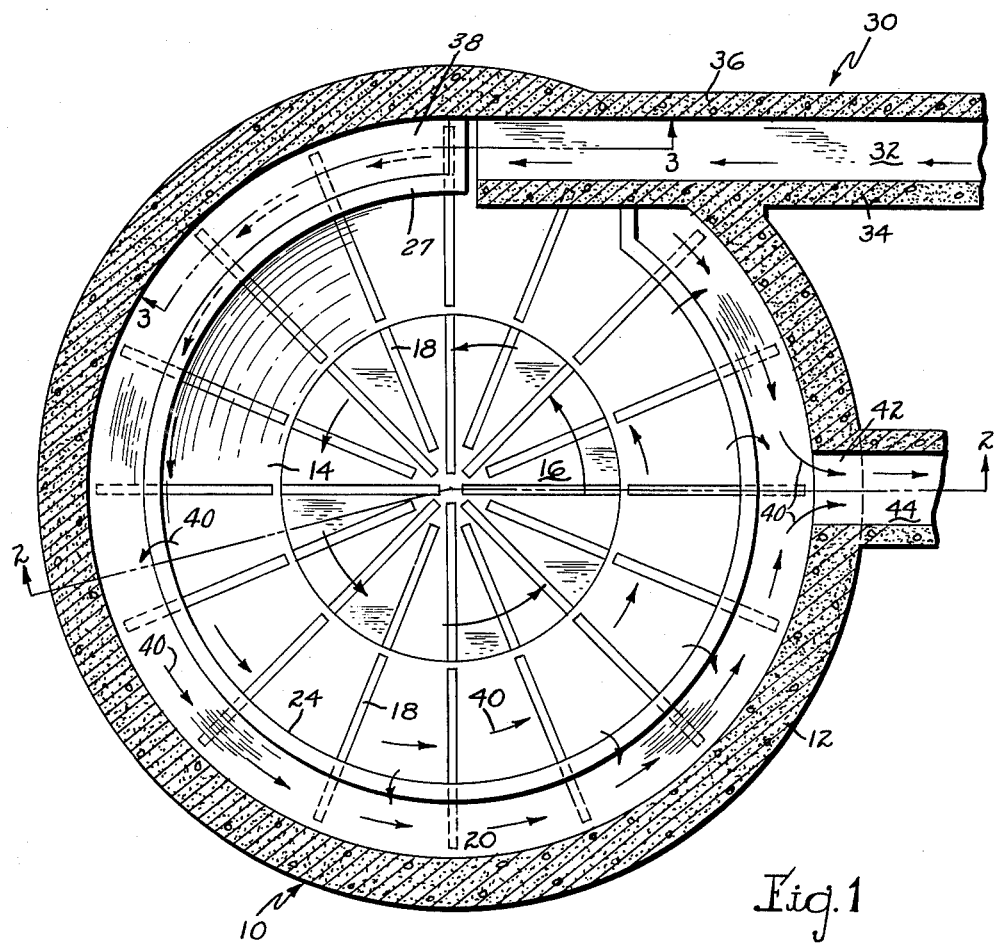
FIG. 1 is a sectional plan view of a centripetal scale pit taken along line 1—1 of FIG. 2.

Referring now to the drawings, a centripetal scale pit 10 is shown comprising an outer cylindrical concrete wall 12 and an inwardly sloping conical surface 14 terminating in a flat central portion 16. Both conical surface 14 and flat central portion 16 are provided with embedded metal protective elements indicated typically at 18 and herein shown in the form of scrap railroad rails.

An inwardly disposed annular receiving trough 20 comprising a flat horizontal annular extension 22 and an upwardly disposed circular wall hereinafter referred to as weir 24 is integrally fabricated to the inner surface of outer cylindrical wall 12 as at 26. As can be seen in FIG. 2, the upper edge 28 of weir 24 defines the effective level 29 to which a pool 31 of cooling water contained within the pit will rise when a flow is introduced through an open-topped sloping flume 30. As can be seen from both FIGS. 1 and 2, flume 30 is comprised of a bottom surface 32 sloping downwardly from a collecting sluiceway (not shown) under the mill stands, with upwardly disposed integrally fabricated inner and outer walls 34 and 36 cooperating to form an inlet for the contaminated cooling water, hereinafter referred to as "influent."

Figure 2:
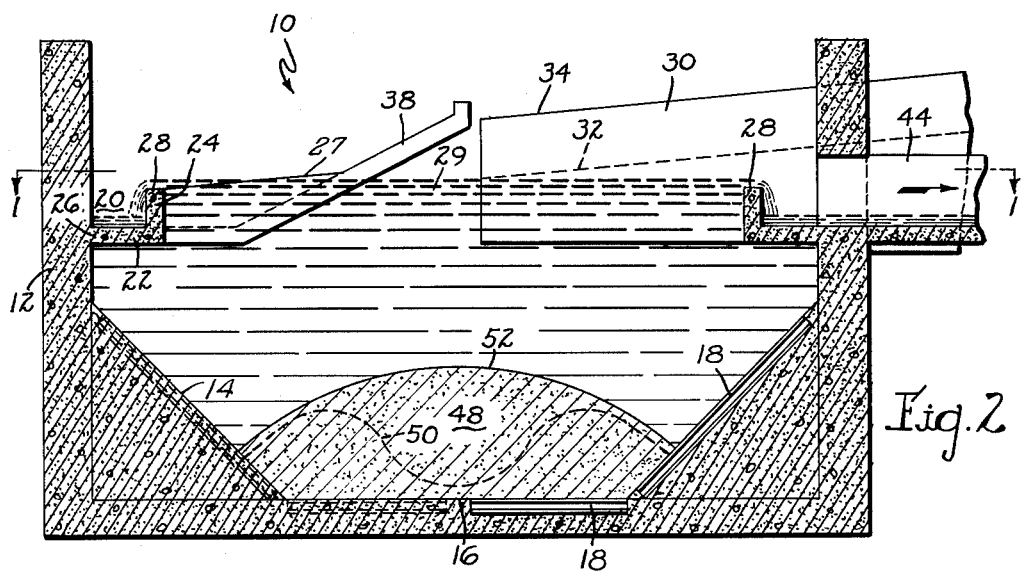
FIG. 2 is a sectional view in elevation of the scale pit taken along line 2—2 of FIG. 1 showing an accumulation of scale deposit therein.
Figure 3:
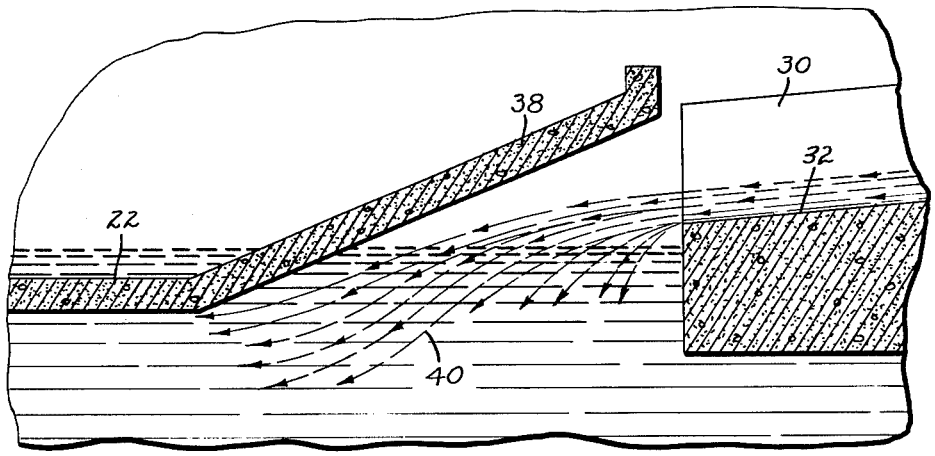
FIG. 3 is an enlarged sectional view taken along line 3—3 of FIG. 1.

As can be better seen in FIGS. 1 and 3, trough 20 is interrupted at one side by flume 30 which enters the pit 10 through wall 12 in tangential relationship thereto, its end terminating just short of an inclined fluid deflecting wall 38. Thus it can be seen that the influent flowing downwardly within sloping flume 30 enters pit 10 and is immediately directed under the horizontal annular extension 22 of trough 20 by fluid deflecting wall 38. Since flume 30 is tangentially disposed to the inner surface of curved wall 12, a centripetal force is created, causing the influent to thereafter assume a circular flow of constantly diminishing radius, ultimately converging at the center of the pit. In addition, the downward force imparted to the water by its entering flow along the sloping surface 32 of flume 30 will cause the water to initially flow downwardly within pool 31 before eventually rising to the surface. Upon reaching the surface, the water will then flow outwardly in a radial direction to the upper edge 28 of weir 24 where it will spill into annular trough 20. At this point, although the scale will have settled out of the water, a deposit of oil will still be present. The mixture of oil and water spilling into trough 20 will hereinafter be referred to as "effluent." The effluent will then assume a circular flow within trough 20 defined by the opposed surfaces of weir 24 and wall 12, thereafter existing through outlet 42 in wall 12. From here, the effluent is carried by a flume 44 to the oil removal basin 46 shown in FIGS. 4–6. This flow pattern has been shown diagrammatically in FIGS. 1 and 3 by a series of arrows indicated typically at 40.

Having thus described the flow characteristics of the cooling water passing through the scale pit, the ultimate disposition of scale suspended therein will now be discussed. As previously described, the influent coming from a collecting sluiceway under the mill stands is carried downwardly towards the pit by flume 30. Because of its rapid rate of flow during this period, little if any scale is deposited on the bottom surface 32 of the flume. If any does reach the flume bottom, it is flushed towards the pit by the action of the water.

Upon entering the pit, the scale is carried with the water under fluid deflecting wall 38. It should be noted at this point that the influent may have entrained a considerable amount of air during its flow from the roll stands to the pit. Consequently as the influent enters beneath the surface 29 of pool 31, a considerable amount of localized bubbling will take place as the entrained air rises to the surface. This will in turn disturb the surface of the pool 29 along the upper edge 28 of weir 24. In order to prevent the possibility of scale particles being carried up and over the edge of the weir by rising air bubbles, the edge has been raised for a limited distance as at 27 in the area of the bubbling action. In this manner, the possibility of contaminating the effluent in trough 20 with scale carried upwardly by air bubbles is eliminated.

Having entered the pit tangentially to the inner curved surface of circular wall 12, the influent then assumes a converging circular path. It should also be noted that when entering the pool, the velocity of the influent is substantially decreased due to the inertia of the liquid contained within the pit. With the velocity of the influent appreciably decreased, gravity then begins to act on the particles of scale and other particulate foreign matter, causing them to settle towards the bottom of the pit. The oil deposits will of course rise to the surface due to the difference in specific gravity between the two liquids.

As previously stated, the relative mass of individual scale particles extends over a considerable range. Consequently, the heavier particles will tend to settle through the water more rapidly than the lighter particles, depositing themselves temporarily on surface 14. However, because of the inwardly sloping effect of this surface and the converging circular flow of the water, these particles will eventually be displaced to the bottom flat surface 16 of the pit. The lighter particles will remain in liquid suspension for a longer period of time, but because of the converging flow of the water will also eventually be deposited on the centrally positioned flat surface 16.

It should be noted at this point that because of the converging circular flow of the water within the pit, the effective distance travelled by the water prior to its entrance into trough 20 is greater than the straight line distance travelled by water in conventional longitudinal pits. In addition, the cross-sectional area of the circular flow path is not diminished to any appreciable extent by scale build-up. These factors combine to provide for a longer period of fluid retention prior to the allowance of flow over weir 24 into trough 20, in turn resulting in a more efficient separation of scale from water. Tests have shown that use of the above-described apparatus results in up to 98% of scale and other particulate foreign matter being removed from the cooling water prior to its flow into annular receiving trough 20.

The behavior of the particles as they settle in a pile 48 on the bottom surfaces of the pit will now be discussed with particular reference to FIG. 2. As scale begins to accumulate on the pit bottom, the pile assumes a cross-sectional configuration as depicted by dotted line 50. As the settling operation continues, the central portion of the pile is gradually filled until a cross-sectional configuration as shown by solid line 52 is assumed.

This concentration of scale on the central flat bottom 16 of the pit greatly facilitates subsequent pit-cleaning operations. More particularly, because the scale is concentrated in an area remote from the main flow pattern of the influent being introduced into the pit, its accumulation has little if any adverse effect on fluid velocity. Consequently, the circular-type pit need not be cleaned as often as conventional longitudinal pits in order to maintain a high level of efficiency. Secondly, the centrally positioned pile permits a clam shovel or other conventional apparatus to be lowered at the exact point of scale concentration without the need of first scraping random deposits into a pile. Damage to the interior surfaces of the pit by the bucket during the cleaning operation is prevented by embedded scrap railroad rails 18 which serve to deflect the bucket as it is lowered therein.

The scale will, of course, be disturbed to some extent during the cleaning operation. However, since this disturbance is at the center of the pit where the circular flow of cooling water is converging, little scale will be lost over the weir 24. This results in the further advantage of being able to clean the pit during operation of the mill without loss of efficiency.

Figure 4:
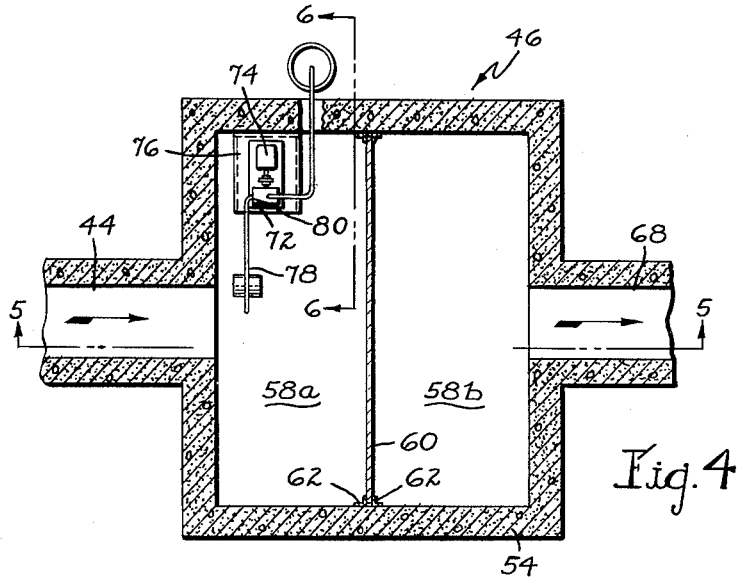
FIG. 4 is a sectional plan view of the oil removal chamber.
Figures 5, 6:
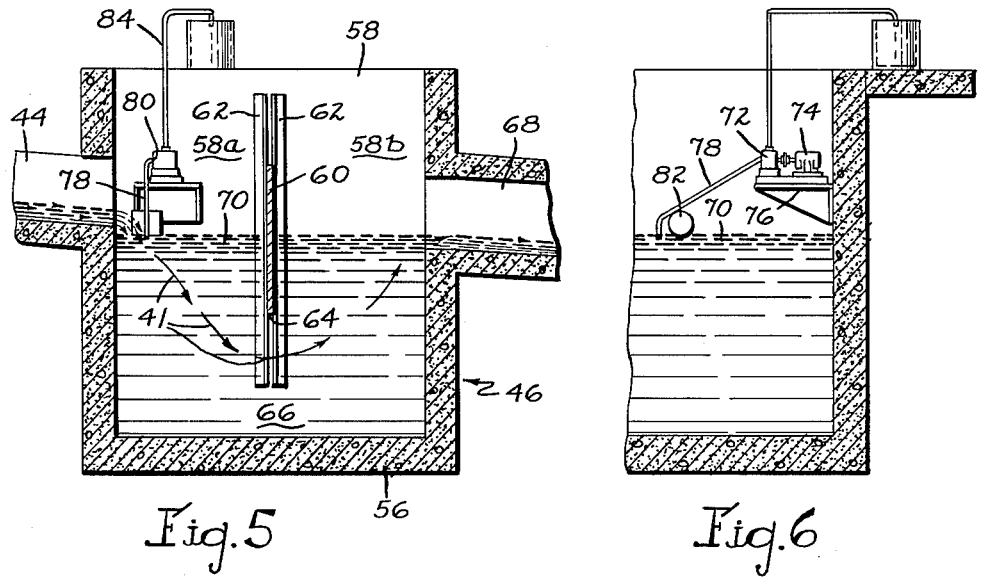
FIG. 5 is a sectional view in elevation taken along line 5—5 of FIG. 4.
FIG. 6 is an enlarged sectional view taken along line 6—6 of FIG. 4.

Having thus described the means of removing scale from the contaminated cooling water, the improved means of removing oil deposits will not be described with particular reference to FIGS. 4–6. It can of course be appreciated that because of the fact that water is heavier than oil, the scale pit 10 relying on the settling effect of gravity will not result in any separation of oil from water. For this reason, the effluent is conducted from scale pit 10 through flume 44 to an oil removal basin generally indicated at 46.

Basin 46 is comprised basically of a rectangular concrete side wall 54 open at the top and closed at the lower end by a flat bottom surface 56. The side wall 54 and bottom surface 56 cooperate to form an inner chamber 58 internally subdivided into two sub-chambers 58a and 58b by a vertically adjustable baffle 60. The low edge 64 of baffle 60 is spaced from the bottom surface 56 of the basin in order to provide a lower rectangular connecting passageway 66 between sub-chambers 58a and 58b. As can be seen in FIGS. 4 and 5, baffle 60 is positioned to ride within vertical tracks formed by spaced angles 62 attached to oppositely disposed surfaces of side wall 54. With this construction, the vertical positioning of the baffle within chamber 58 can be readily adjusted in order to vary the dimensions of rectangular connecting passageway 66.

Effluent flows from scale pit 10 and is carried by flume 44 through side wall 54 into sub-chamber 58a. Because of connecting passageway 66, liquid will also flow from sub-chamber 58a into sub-chamber 58b. The liquid level will rise in both sub-chambers until water begins to exit from sub-chamber 58b through flume 68. Flume 68 acts to carry water back to the original source of cooling water.

It should be noted that with this construction, the tendency of oil to rise to the surface of a pool of water has been advantageously utilized. More particularly, as indicated by arrows 41, liquid must initially flow downwardly and around the lower edge 64 of baffle 60 when passing from sub-chamber 58a to sub-chamber 58b. Since oil has a tendency to rise in water, it will flow upwardly in an opposite direction and will therefore be prevented from migrating into sub-chamber 58b. The size of passageway 66 can be varied by vertically adjusting baffle 60 in order to retard the rate of fluid flow between the two sub-chambers. In this manner, an upward flow of oil within sub-chamber 58a can always be assured. As can be seen in FIGS. 5 and 6, this arrangement results in a surface accumulation or film 70 of oil in sub-chamber 58a.

An oil pump 72 driven by a conventional electric motor 74 is mounted within sub-chamber 58a on a platform 76 extending inwardly from the side wall of the oil removal basin. The pump suction line 78 is pivotally attached at one end to the pump as at 80 by means of a swivel joint and extends outwardly therefrom, its other end supported by a float 82 floating on the surface of the liquid contained within sub-chamber 58a. The discharge line 84 empties into an oil collecting tank 86.

As can be better seen in FIG. 6, float 82 acts to keep the end of suction line 78 just beneath the surface of the oil accumulation 70. In this manner, whenever the pump is actuated, the oil film 70 can be quickly and efficiently removed from the surface of the water. This can either be done automatically at timed intervals or manually by operating personnel.

It is my intention to cover all changes and modifications of the invention herein chosen for purposes of disclosure which do not constitute departures from the spirit and scope of the invention.

I claim:

1. For use in a rolling mill, apparatus for removing solid contaminative matter such as mill scale from cooling water, said apparatus comprising in combination: a tank having a cylindrical side wall open at the top and closed at the bottom; an annular trough coextensive with the inner surface of said cylindrical side wall, said trough defined by a circular weir radially spaced from said side wall by an annular bottom member, the upper edge of said weir terminating at a level below that of the upper edge of said side wall; downwardly sloping inlet means for tangentially introducing an influent mixture of cooling water and solid contaminative matter into said tank at an elevation slightly above that of the upper edge of said weir, the said influent mixture thus collecting in a pool in said tank, the surface elevation of said pool being defined by the upper edge of said weir; and downwardly sloping guide means immediately adjacent to the delivery end of said inlet means for directing the entire incoming flow of influent mixture introduced by said inlet means downwardly beneath said annular trough, whereby the solid contaminative matter in said influent mixture will settle out of said cooling water to the bottom of said tank prior to the arrival of said cooling water at the surface of said pool, from whence the cooling water will flow radially over the upper edge of said weir into said trough.

2. The apparatus as set forth in claim 1 wherein said guide means is comprised of a deflecting wall sloping upwardly from the bottom of said trough to a point adjacent to and higher than the entry of said inlet means into said tank.

3. In a rolling mill, apparatus for removing oil and mill scale from cooling water comprising the combination of: a centripetal scale settling tank having a cylindrical side wall, said tank open at the upper end and closed at the lower end by a substantially flat bottom surface; inlet means for introducing an influent mixture of cooling water, oil and mill scale into said tank in order to produce a pool therein, said pool having a centripetal flow with mill scale settling downwardly towards said bottom surface as oil rises to the surface of said pool, said inlet means comprising a sloping flume entering said tank tangentially through said cylindrical side wall at a point immediately above the surface level of said pool; outlet means for continuously removing water and oil from the surface of said pool, said outlet means comprising an annular trough defined by a circular weir radially spaced from the interior surface of said side wall by an annular bottom member, the upper edge of said weir defining the surface level said pool, thereby permitting a smooth continuous flow of water and oil from the surface of said pool into said trough; guide means for directing the incoming flow of the influent mixture introduced by said inlet means downwardly beneath said annular trough, said guide means comprising a deflecting wall sloping upwardly from the annular bottom member of said trough to a point adjacent to and higher than the entry of said flume into said tank; and oil removal means for separating and removing oil from said water, said oil removal means comprising an oil removing chamber subdivided into first and second sub-chambers, said first sub-chamber connected to said second sub-chamber by a lower passageway, means in communication with said outlet means for filling said first sub-chamber with a mixture of oil and cooling water whereby said oil will rise to the surface of said first sub-chamber and remain in said first sub-chamber as said water flows downwardly in said first sub-chamber through said passageway to said second sub-chamber, means for continuously removing said oil from the surface of said first sub-chamber, means for adjusting the size of said lower passageway in order to adjust the rate of flow between said first and second sub-chambers, and means for continuously removing water from said second sub-chamber.

References Cited by the Examiner

UNITED STATES PATENTS

| | | | |
|---|---|---|---|
| 841,176 | 1/1907 | Powers | 210—242 X |
| 2,088,294 | 7/1937 | Geiger | 210—512 |
| 2,425,932 | 8/1947 | Green et al. | 210—84 |
| 2,574,685 | 11/1951 | Baxter et al. | 210—220 X |
| 2,782,929 | 2/1957 | Colket | 210—320 X |
| 3,204,773 | 9/1965 | Lind | 210—525 |

REUBEN FRIEDMAN, *Primary Examiner.*

J. DE CESARE, *Assistant Examiners.*